US012738405B2

(12) United States Patent
Lee et al.

(10) Patent No.: US 12,738,405 B2
(45) Date of Patent: Sep. 15, 2026

(54) COIL MEMBER AND CAMERA MODULE COMPRISING SAME

(71) Applicant: LG INNOTEK CO., LTD., Seoul (KR)

(72) Inventors: Sang Kyu Lee, Seoul (KR); Sung Yong Park, Seoul (KR); Seung Jin Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 609 days.

(21) Appl. No.: 18/260,083

(22) PCT Filed: Jan. 11, 2022

(86) PCT No.: PCT/KR2022/000423
§ 371 (c)(1),
(2) Date: Jun. 30, 2023

(87) PCT Pub. No.: WO2022/154421
PCT Pub. Date: Jul. 21, 2022

(65) Prior Publication Data

US 2024/0079174 A1 Mar. 7, 2024

(30) Foreign Application Priority Data

Jan. 13, 2021 (KR) ........................ 10-2021-0004544

(51) Int. Cl.
*H01F 27/02* (2006.01)
*H01F 5/00* (2006.01)
(Continued)

(52) U.S. Cl.
CPC ........... *H01F 27/022* (2013.01); *H01F 5/003* (2013.01); *H01F 27/2804* (2013.01); *H04N 23/54* (2023.01); *H01F 2027/2809* (2013.01)

(58) Field of Classification Search
CPC .... H01F 27/022; H01F 5/003; H01F 27/2804; H01F 2027/2809; H04N 23/54; H04N 23/55
(Continued)

(56) References Cited

U.S. PATENT DOCUMENTS 6,035,528 A * 3/2000 Sasaki .................... H10P 54/00 83/929.2
8,325,003 B2 * 12/2012 Wu .................... H01F 17/0013 336/200
(Continued)

FOREIGN PATENT DOCUMENTS

CN 107347255 A 11/2017
CN 206902222 U 1/2018
(Continued)

OTHER PUBLICATIONS

International Search Report dated May 12, 2022 in International Application No. PCT/KR2022/000423.
(Continued)

*Primary Examiner* — Shawki S Ismail
*Assistant Examiner* — Kazi S Hossain
(74) *Attorney, Agent, or Firm* — SALIWANCHIK, LLOYD & EISENSCHENK

(57) ABSTRACT

A coil member according to an embodiment comprises: a substrate comprising a first surface and a second surface opposite to the first surface, and comprising a hole; a circuit pattern that is disposed on at least one of the first surface and the second surface and comprises a wiring pattern, a plating pattern, and a dummy pattern; and a protective layer that is disposed on the substrate and surrounds the circuit pattern, wherein the protective layer comprises a first protective layer disposed on the first surface and a second protective layer disposed on the second surface, the substrate com-
(Continued)

prises a first edge disposed on the outer edge of the substrate and a second edge surrounding the hole, and the substrate comprises a 1-1 region adjacent to the first edge, and a 1-2 region, wherein the 1-1 region is disposed between the first edge and the 1-2 region, a 1-1 protective layer is disposed on a first surface of the 1-1 region, a 1-2 protective layer is disposed on a first surface of the 1-2 region, and the thickness deviation of the 1-1 protective layer is 0.1 μm or less.

20 Claims, 9 Drawing Sheets

(51) Int. Cl.
*H01F 27/28* (2006.01)
*H04N 23/54* (2023.01)

(58) Field of Classification Search
USPC ........................................ 336/200, 232, 192
See application file for complete search history.

(56) References Cited

U.S. PATENT DOCUMENTS

2003/0137385 A1* 7/2003 Ahn ..................... H01F 41/046
336/200
2014/0009254 A1* 1/2014 Ohkubo ............. H01F 17/0033
336/192
2016/0011394 A1 1/2016 Cho et al.
2016/0086714 A1 3/2016 Moon et al.
2018/0137965 A1 5/2018 Lee
2021/0168945 A1 6/2021 Kim et al.

FOREIGN PATENT DOCUMENTS

CN 108074707 A 5/2018
CN 110091524 A 8/2019
JP 2017-49603 A 3/2017
KR 10-1527433 B1 6/2015
KR 10-1580411 B1 12/2015
KR 10-2016-0007083 A 1/2016
KR 10-2018-0036871 A 4/2018
KR 10-2020-0011121 A 2/2020
KR 10-2020-0092560 A 8/2020
KR 10-2020-0133515 A 11/2020

OTHER PUBLICATIONS

Office Action dated May 1, 2026 in Chinese Application No. 202280009662.8.

* cited by examiner

COIL MEMBER AND CAMERA MODULE COMPRISING SAME

CROSS-REFERENCE TO RELATED APPLICATIONS

This application is the U.S. national stage application of International Patent Application No. PCT/KR2022/000423, filed Jan. 11, 2022, which claims the benefit under 35 U.S.C. § 119 of Korean Application No. 10-2021-0004544, filed Jan. 13, 2021, the disclosures of each of which are incorporated herein by reference in their entirety.

TECHNICAL FIELD

Embodiments relate to a coil member and a camera module including the same.

BACKGROUND ART

As various portable terminals are widely used and the wireless Internet service is commercialized, needs of consumers related to the portable terminals are diversified, and accordingly, various kinds of additional devices are installed in the portable terminals.

A representative one of them is a camera module that may photograph a subject in a photograph or a moving image, store the image data, and then edit and transmit the image data as needed.

In recent years, there has been an increasing demand for small camera modules for use in various multimedia fields such as note type personal computers, camera phones, PDAs, smart devices, toys, etc., and for image input devices such as surveillance cameras and information terminals of video tape recorders.

Conventional camera modules are roughly classified into fixed focus (F.F) type, auto focus (A.F) type, and optical image stabilization (OIS) type camera modules.

Meanwhile, in the case of the OIS type, a coil member disposed on a circuit board may be included as a component for realizing a camera shake prevention function.

Such a coil member may be formed by disposing a coil-shaped circuit pattern on a substrate.

Meanwhile, the coil member may be formed by forming a plurality of unit coil members on a large-area substrate and cutting each unit coil member using a laser. Since this cutting process is performed using a high-temperature laser, an insulating layer on a upper part of the unit coil member may be carbonized by the high-temperature laser during the cutting process. Particles generated from the carbonized insulating layer may be dispersed around the cutting region.

Accordingly, appearance defects may occur due to particles of the insulating layer carbonized around the cut region of the unit coil member. As a result, an additional process of cleaning around the cutting region is required.

Therefore, there is a need for a coil member capable of solving the above problems and a camera module including the same.

DISCLOSURE

Technical Problem

An Embodiment provide a coil member having improved appearance characteristics and thickness uniformity, and a camera module including the same.

Technical Solution

A coil member according to an embodiment includes: a substrate including a first surface and a second surface opposite to the first surface and including a hole; a circuit pattern disposed on at least one of the first surface and the second surface and including a wiring pattern, a plating pattern, and a dummy pattern; and a protective layer disposed on the substrate while surrounding the circuit pattern, wherein the protective layer includes a first protective layer disposed on the first surface; and a second protective layer disposed on the second surface, wherein the substrate includes a first edge disposed outside the substrate and a second edge surrounding the hole, wherein the substrate includes a 1-1 region and a 1-2 region adjacent to the first edge, wherein the 1-1 region is disposed between the first edge and the 1-2 region, wherein a 1-1 protective layer is disposed on the first surface of the 1-1 region, wherein a 1-2 protective layer is disposed on the first surface of the 1-2 region, wherein a thickness deviation of the 1-1 protective layer is 0.1 μm or less.

Advantageous Effects

The coil member according to the embodiment may reduce a thickness deviation between an adjacent region and a distant region at a first edge, which is an outer edge, and a second edge, which is an inner edge. That is, the coil member may have improved thickness uniformity in region adjacent to and in region far from the first edge and the second edge, which are outer edges.

In addition, the coil member may have the same or similar thickness uniformity in region adjacent to and in region far from the first edge and the second edge, which are outer edges.

Accordingly, in the coil member according to the embodiment, a thickness deviation of adjacent regions at the first edge and the second edge defined as the cut region may be reduced, and a thickness uniformity difference from other regions may be reduced.

Accordingly, the coil member according to the embodiment may inhibit defects in appearance due to thickness deviation between regions, and may inhibit bending due to stress difference of the coil member due to thickness deviation. Therefore, the reliability of the coil member may be improved.

In addition, the coil member according to the embodiment further includes a third protective layer disposed on an outer surface of the first edge and a fourth protective layer disposed on an inner surface of the second edge. Therefore, it is possible to improve the adhesion of the protective layer.

That is, contact areas of the first protective layer and the second protective layer disposed on the first and second surfaces of the substrate are increased by the third protective layer and the fourth protective layer. Accordingly, adhesion between the first protective layer and the second protective layer may be improved.

In addition, the third protective layer and the fourth protective layer do not directly contact a printed circuit board with which the coil member contacts. Therefore, when the coil member is applied to the camera module, bonding failure does not occur even if the thicknesses of the third and fourth protective layers are not uniform.

Thus, the coil member according to the embodiment may have improved reliability.

MODES OF THE INVENTION

Hereinafter, embodiments of the present disclosure will be described in detail with reference to the accompanying drawings. However, the spirit and scope of the present disclosure is not limited to a part of the embodiments described, and may be implemented in various other forms, and within the spirit and scope of the present disclosure, one or more of the elements of the embodiments may be selectively combined and replaced.

In addition, unless expressly otherwise defined and described, the terms used in the embodiments of the present disclosure (including technical and scientific terms) may be construed the same meaning as commonly understood by one of ordinary skill in the art to which the present disclosure belongs, and the terms such as those defined in commonly used dictionaries may be interpreted as having a meaning that is consistent with their meaning in the context of the relevant art.

In addition, the terms used in the embodiments of the present disclosure are for describing the embodiments and are not intended to limit the present disclosure. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present disclosure, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a coil member according to an embodiment will be described with reference to the drawings.

Figure 1:
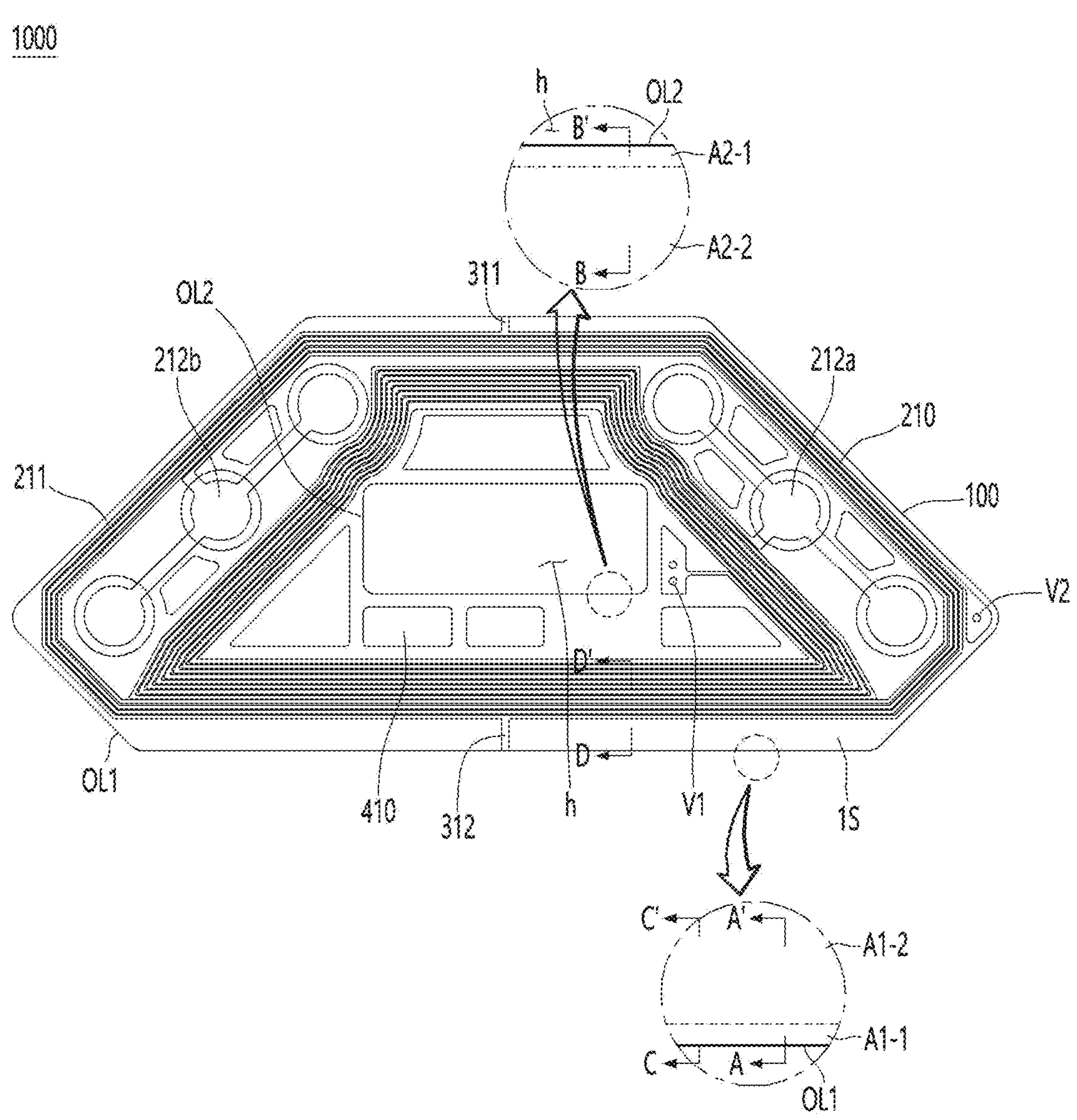
FIG. 1 is a bottom view of the coil member according to the embodiment.
Figure 2:
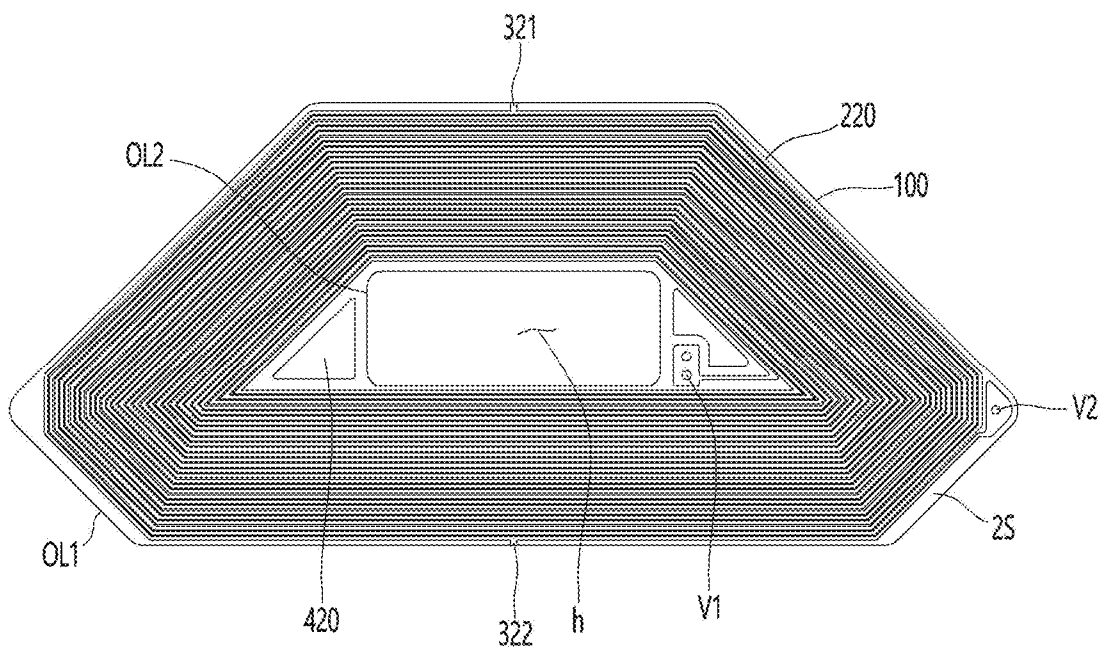
FIG. 2 is a top view of the coil member according to the embodiment.

FIG. 1 is a bottom view of the coil member according to the embodiment. FIG. 2 is a top view of the coil member according to the embodiment.

The coil member 1000 may include a substrate 100 and a circuit pattern disposed on the substrate 100.

The substrate 100 may be a flexible substrate. That is, the substrate 100 may include a flexible plastic. For example, the substrate 100 may be a polyimide (PI) substrate. However, the embodiment is not limited thereto, and the substrate 100 may be a substrate made of a polymer material such as polyethylene terephthalate (PET) or polyethylene naphthalate (PEN).

The substrate 100 may be an insulating substrate. That is, the substrate 100 may be the insulating substrate supporting various circuit patterns.

The substrate 100 may have a thickness of 20 μm to 100 μm. For example, the substrate 100 may have a thickness of 25 μm to 75 μm. For example, the substrate 100 may have a thickness of 30 μm to 40 μm. When the thickness of the substrate 100 exceeds 100 μm, the overall thickness of the coil member may increase. In addition, when the thickness of the substrate 100 is less than 20 μm, the substrate 100 may be vulnerable to heat, pressure, or the like in a process of forming a coil electrode of the substrate 100.

A hole h may be formed on the substrate 100. In detail, the hole h passing through the substrate 100 may be formed in a central region of the substrate 100. When the coil member 1000 is applied to a camera module, the hole h may serve as a driving of the camera module, for example, a sensing hole, or the like.

The substrate 100 may include a plurality of regions. For example, a plurality of regions may be defined based on an edge of the substrate 100.

Referring to FIGS. 1 and 2, the substrate 100 may include a first edge OL1 and a second edge OL2. In detail, the substrate 100 may include the first edge OL1 defined as an outer edge of the substrate 100 and the second edge OL2 defined as an inner edge of the substrate 100.

The first edge OL1 and the second edge OL2 may be defined as regions to be cut when forming the coil member 1000. That is, the coil member 1000 may be formed by cutting coil members having a unit area disposed on a large-area substrate along the first edge OL1 and the second edge OL2 with a laser.

The first edge OL1 may be disposed outside the substrate 100 and may be formed to surround the substrate 100, that is, the coil member 1000. Also, the second edge OL2 may be disposed inside the substrate 100 and may be formed to surround the hole h of the coil member 1000.

A plurality of regions of the substrate 100 may be defined based on the first edge OL1 and the second edge OL2.

In detail, the substrate 100 includes a 1-1 region A1-1 relatively adjacent to the first edge OL1 and a 1-2 region A1-2 relatively not adjacent to the first edge OL1. That is, the 1-1 region A1-1 may be disposed between the first edge OL1 and the 1-2 region A1-2.

In detail, the substrate 100 includes a 2-1 region A2-1 relatively adjacent to the second edge OL2 and a 2-2 region A2-2 relatively not adjacent to the second edge OL2. That is, the 2-1 region A2-1 may be disposed between the second edge OL2 and the 2-2 region A2-2.

The coil member 1000 may have similar thickness uniformity in the 1-1 region A1-1 and the 1-2 region A1-2. Also, the 2-1 region A2-1 and the 2-2 region A2-2 may have similar thickness uniformity. That is, the protective layer on the 1-1 region A1-1 and the protective layer on the 1-2 region A1-2 have similar thickness uniformity. Also, the protective layer on the 2-1 region A2-1 and the protective layer on the 2-2 region A2-2 may have similar thickness uniformity.

The thickness uniformity of the coil member 1000 will be described in detail below.

The circuit pattern may be disposed on the substrate 100. In detail, the circuit pattern may be disposed on both surfaces of the substrate 100. That is, the circuit pattern may be disposed on a first surface 1S of the substrate 100 and a second surface 2S opposite to the first surface 1S. That is, the circuit pattern may include a first circuit pattern disposed on the first surface 1S and a second circuit pattern disposed on the second surface 2S.

Alternatively, the circuit pattern may be disposed on the first surface 1S of the substrate 100 or the second surface 2S opposite to the first surface 1S. That is, the circuit pattern may be disposed on at least one of the first surface 1S of the substrate 100 and the second surface 2S opposite to the first surface 1S.

The circuit pattern may include a plurality of types of patterns. In detail, the circuit pattern may include a plurality of types of patterns according to roles, positions, and connection relationships of the patterns. In detail, the circuit pattern may include a wiring pattern, a plating pattern, and a dummy pattern.

Wiring patterns 210 and 220 may include a first wiring pattern 210 and a second wiring pattern 220. In detail, the wiring patterns 210 and 220 may include the first wiring pattern 210 disposed on the first surface 1S of the substrate 100 and the second wiring pattern 220 disposed on the second surface 2S of the substrate 100.

Here, the first surface 1S of the substrate 100 may be defined as a surface facing a printed circuit board of the camera module on which the coil member 1000 is disposed, and the second surface 2S of the substrate 100 may be defined as a surface opposite to the first surface 1S.

The first wiring pattern 210 may be disposed on a lower surface of the coil member 1000. The first wiring pattern 210 may be disposed in a closed loop coil shape on the first surface 1S of the substrate 100. That is, the first wiring pattern 210 may be a first coil pattern disposed on the first surface 1S of the substrate 100.

The first wiring pattern 210 may include a wiring portion 211 and pad portions 212*a* and 212*b*. The first wiring pattern 210 may be electrically connected to the printed circuit board disposed under the coil member 1000 through the pad portions 212*a* and 212*b*. The pad portions 212*a* and 212*b* may be formed in plural, and the embodiment is not limited to the number of pad portions shown in FIGS. 1 and 2.

The second wiring pattern 220 may be disposed on an upper surface of the coil member 1000. The second wiring pattern 220 may be disposed in the closed loop coil shape on the second surface 2S of the substrate 100. That is, the second wiring pattern 220 may be a second coil pattern disposed on the second surface 2S of the substrate 100.

The first wiring pattern 210 and the second wiring pattern 220 may be connected to each other. In detail, the first wiring pattern 210 and the second wiring pattern 220 may be connected to each other through via holes formed in the substrate 100.

In detail, the first wiring pattern 210 may include a 1-1 connection region and a 1-2 connection region. A first via hole V1 may be formed in the 1-1 connection region, and a second via hole V2 may be formed in the 1-2 connection region.

In addition, the second wiring pattern 220 may include a 2-1 connection region and a 2-2 connection region. The first via hole V1 may be formed in the 2-1 connection region, and the second via hole V2 may be formed in the 2-2 connection region.

The first via hole V1 or the second via hole V2 may be formed of one or two or more, respectively. When the first via hole V1 or the second via hole V2 is formed in plural, even though a connection failure occurs in any one of the via holes during the process, it is possible to connect in the other via holes, thereby minimizing a characteristic failure of the coil member.

In addition, in order to form the plurality of via holes, the wiring pattern of the connection region may be formed wider than the wiring pattern forming a closed roof. Accordingly, when the first wiring pattern and the second wiring pattern are connected through the connection region, it is possible to inhibit an alignment failure in which the first wiring pattern, the connection region, and the second wiring pattern are not connected.

The first wiring pattern 210 may include a first pad portion 212*a* and a second pad portion 212*b*. When a signal is transmitted from the first pad portion 212*a* on the first surface 1S of the substrate 100 connected to the printed circuit board, the signal may be transmitted to the 1-1 connection region in a coil shape from the outside to the inside along the first wiring pattern 210 and may be transmitted from the 1-1 connection region to the 2-1 connection region of the second surface 2S through the first via hole V1.

Subsequently, the signal may be transmitted to the 2-2 connection region in the coil shape from the inside to the outside along the second wiring pattern 220 and may be transmitted to the 1-2 connection region of the first surface 1S through the second via hole V2. Then, the signal may be transmitted to the second pad portion 212*b* along the first wiring pattern 220, and the signal may be transmitted to the printed circuit board again.

The first pad portion 212*a* or the second pad portion 212*b* may be formed of one or two or more pad portions, respectively. In other words, the first pad portion 212*a* or the second pad portion 212*b* may be formed in plurality. Accordingly, it is possible to inhibit a contact failure that may occur when the pad portion and the printed circuit board are connected.

The plating pattern may be connected to the wiring pattern. The plating pattern may be part of a plating line remaining on the substrate 100 after manufacturing the coil member. The plating pattern may transfer current to the wiring pattern to form a plating layer of the wiring pattern.

The plating pattern may include a first plating pattern and a second plating pattern. The plating pattern may include the first plating pattern disposed on the first surface 1S of the substrate 100 and including a 1-1 plating pattern 311 and a 1-2 plating pattern 312 and the second plating pattern disposed on the second surface 2S of the substrate 100 and including a 2-1 plating pattern 321 and a 2-2 plating pattern 322.

Alternatively, the plating pattern may include the first plating pattern disposed on the first surface 1S of the substrate 100 and including at least one of the 1-1 plating pattern 311 and the 1-2 plating pattern 312 or the second plating pattern disposed on the second surface 2S of the substrate 100 and including at least one of the 2-1 plating pattern 321 and the 2-2 plating pattern 322. That is, the plating pattern may include at least one of the first plating pattern and the second plating pattern.

The 1-1 plating pattern 311 and the 1-2 plating pattern 312 may be connected to the first wiring pattern 210. In detail, the 1-1 plating pattern 311 and the 1-2 plating pattern 312 may be connected to the first wiring pattern 210 disposed at the outermost portion among the first wiring patterns 210. Accordingly, the first wiring pattern 210 may include a plating layer formed through an electrolytic plating process using a current transmitted through the 1-1 plating pattern 311 and the 1-2 plating pattern 312.

In addition, the 2-1 plating pattern 321 and the 2-2 plating pattern 322 may be connected to the second wiring pattern 220. In detail, the 2-1 plating pattern 321 and the 2-2 plating pattern 322 may be connected to the second wiring pattern 220 disposed at the outermost portion among the second wiring patterns 220. Accordingly, the second wiring pattern 220 may include a plating layer formed through an electrolytic plating process using a current transmitted through the 2-1 plating pattern 321 and the 2-2 plating pattern 322.

The first plating pattern may be disposed to extend to an end of the substrate 100. Alternatively, the first plating pattern may be disposed to extend so as to further protrude from the end of the substrate 100.

In addition, the second plating pattern may be disposed to extend to the end of the substrate 100. Alternatively, the second plating pattern may be disposed to extend so as to further protrude from the end of the substrate 100.

Dummy patterns 410 and 420 may include a first dummy pattern 410 and a second dummy pattern 420. In detail, the dummy patterns 410 and 420 may include the first dummy pattern 410 disposed on the first surface 1S of the substrate 100 and the second dummy pattern 420 disposed on the second surface 2S of the substrate 100.

The first dummy pattern 410 and the second dummy pattern 420 may be respectively disposed on a region where the wiring patterns 210 and 220 and the plating pattern are not disposed on the first surface 1S and the second surface 2S of the substrate 100. That is, the first dummy pattern 410 and the second dummy pattern 420 may be disposed to be spaced apart from the wiring patterns 210 and 220 and the plating pattern.

In addition, the first dummy pattern 410 and the second dummy pattern 420 may be disposed to be disconnected without being connected to other patterns. That is, a signal may not be transmitted to the first dummy pattern 410 and the second dummy pattern 420. That is, no signal is transmitted to the first dummy pattern 410 and the second dummy pattern 420, and The first dummy pattern 410 and the second dummy pattern 420 are disposed on both sides of the substrate 100 to inhibit disconnection between the wiring patterns, and to serve as an alignment mark when forming the wiring patterns.

Protective layers 510 and 520 may be respectively disposed on the wiring patterns 210 and 220, the plating patterns 310 and 320, and the dummy patterns 410 and 420. The protective layers 510 and 520 may be disposed to surround the wiring patterns 210 and 220, the plating patterns 310 and 320, and the dummy patterns 410 and 420. Accordingly, it is possible to inhibit oxidation of the wiring pattern by external moisture, air, and the like, and to inhibit film removal of the wiring pattern.

The protective layers 510 and 520 may be disposed to partially expose the wiring pattern. In detail, the protective layers 510 and 520 may be disposed on the wiring portion 211 and may not be disposed on the pad portions 212*a* and 212*b*. That is, the protective layers 510 and 520 may be disposed to expose the pad portions 212*a* and 212*b*. Accordingly, the wiring pattern disposed on the first surface 1S of the substrate 100, that is, a lower surface of the coil member, may be connected to the terminal of the printed circuit board of the camera module on which the coil member is disposed through the pad portions 212*a* and 212*b*. That is, the protective layers 510 and 520 may be formed on the entire surface on the second surface 2S of the substrate and may be all disposed in a region excluding the pad portions 212*a* and 212*b* of the wiring pattern on the first surface 1S.

The protective layers 510 and 520 may include a first protective layer 510 and a second protective layer 520. In detail, the protective layers 510 and 520 may include the first protective layer 510 disposed on the first surface 1S of the substrate 100 and the second protective layer 520 disposed on the second surface 2S of the substrate 100.

The first protective layer 510 and the second protective insect 520 may be disposed to have different thicknesses. For example, the first protective layer 510 may be disposed to have a thickness smaller than that of the second protective layer 520. That is, the first protective layer 510 disposed on one surface 1S of the substrate on which the pad portion of the wiring pattern is disposed may be disposed to have a thickness smaller than that of the second protective layer 520 in order to connect the pad portion and the terminal of the printed circuit board.

For example, the thickness of the protective layers 510 and 520 may be 10 μm to 40 μm, and the first protective layer 510 may be disposed to have a thickness smaller than that of the second protective layer 520 in the above range.

However, the embodiment is not limited thereto, the thickness of the first protective layer and the second protective layer may be formed to be the same as or similar by forming the thickness of the second protective layer 520 of the substrate to be small.

When the thickness of the protective layers 510 and 520 exceeds 40 μm, the thickness of the coil member may increase. When the thickness of the protective layers 510 and 520 is less than 10 μm, the reliability of the wiring pattern of the coil member may be deteriorated.

The protective layers 510 and 520 may include an insulating material. The protective layers 510 and 520 may include various materials that may be cured by heating after being applied to protect a surface of the wiring pattern.

The protective layers 510 and 520 may be a resist layer. For example, the protective layers 510 and 520 may be a solder resist layer including an organic polymer material. As an example, the protective layers 510 and 520 may include an epoxy acrylate-based resin. In detail, the protective layers 510 and 520 may include a resin, a curing agent, a photoinitiator, a pigment, a solvent, a filler, an additive, an acryl-based monomer, and the like. However, the embodiment is not limited thereto, and the protective layers 510 and 520 may be any one of a photo-solder resist layer, a cover-lay, and a polymer material.

As described above, in the coil member 1000, the 1-1 region A1-1 and the 1-2 region A1-2 have similar thickness uniformity, and the 2-1 region A2-1 and the 2-2 region A2-2 have similar thickness uniformity.

In detail, in the coil member 1000, protective layers may be disposed on the 1-1 region A1-1, the 1-2 region A1-2, the 2-1 region A2-1, and the 2-2 region A2-2, respectively.

Conventionally, the regions adjacent to the first edge OL1 and the second edge OL2 of the coil member 1000, that is, the 1-1 region A1-1 and the 2-1 region A2-1, do not have a uniform thickness of the coil member compared to other regions. That is, the protective layers 510 and 520 of the first edge OL1 and the second edge OL2 defined as the cutting region may be melted together during the cutting process. In addition, as particles generated from the protective layer are deposited by carbonization of the protective layer, thicknesses of regions adjacent to the first edge OL1 and the second edge OL2 may not be uniform.

Accordingly, after the coil member is cut, appearance defects of the coil member may occur in a region adjacent to the cut region. In addition, an additional cleaning process to remove such defects in appearance may be required, which may reduce process efficiency.

Therefore, the coil member according to the embodiment may solve the above problems by inhibiting a decrease in thickness uniformity and appearance defects occurring during a cutting process.

FIGS. 3 to 7 are views for describing a cutting process of a coil member according to a first embodiment.

Figure 3:
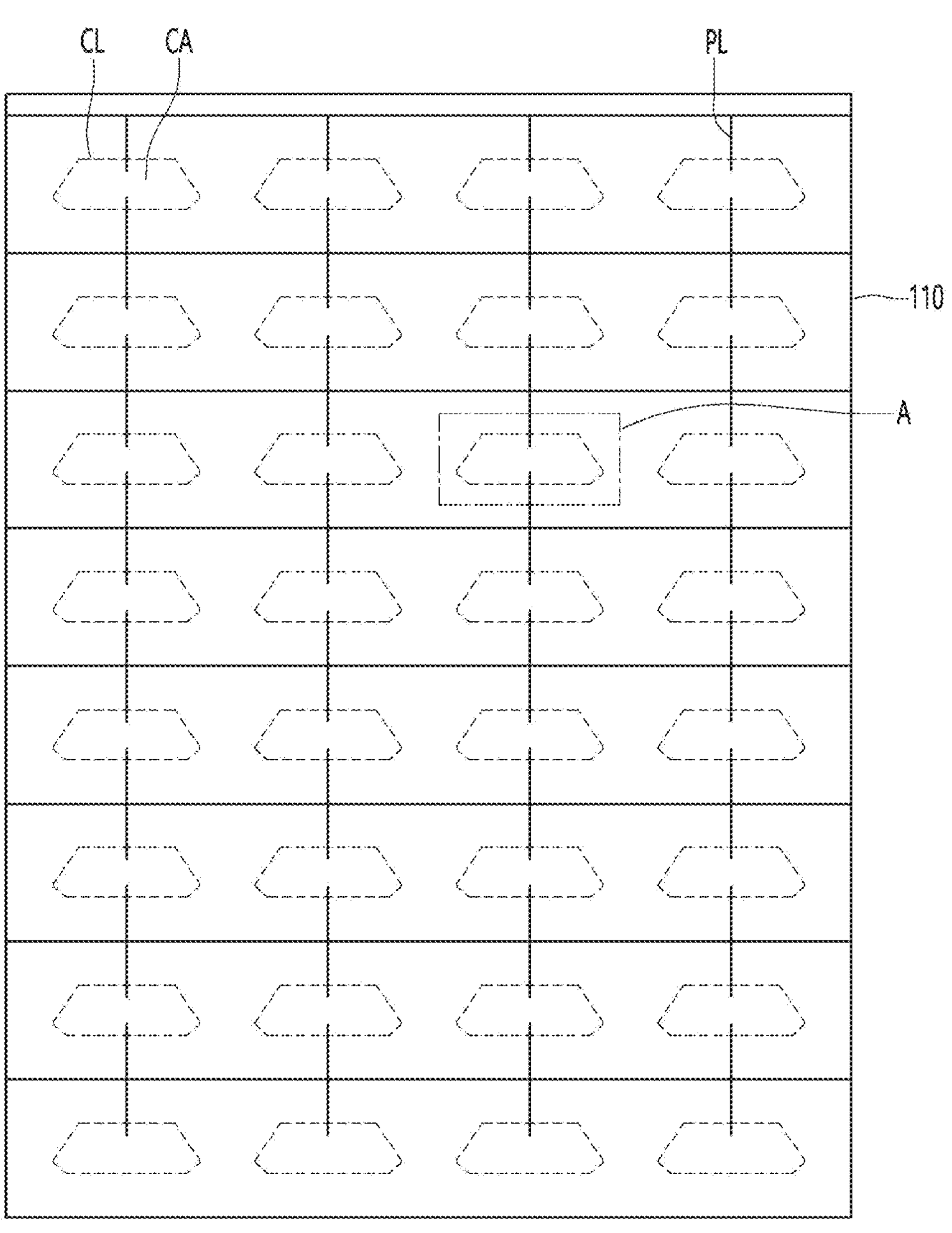
FIGS. 3 to 7 are views for describing a cutting process of a coil member according to a first embodiment.

Referring to FIG. 3, a plurality of coil member regions CA may be formed on a base member 110. In detail, a cutting line CL may be formed on the base member 110 to form an outer edge of the coil member 1000. The coil member region CA may be disposed inside the cutting line CL.

A circuit pattern (not shown) forming a coil member may be formed inside the coil member region CA. Accordingly, a plurality of coil members having circuit patterns may be formed on the base member 110. In addition, a protective layer for protecting the circuit pattern may be disposed on the entire surface of the base member 110.

Accordingly, in the coil member region CA, the protective layer may be disposed on the circuit pattern in a region where the circuit pattern is disposed, and the protective layer may be disposed on the base member in a region where the circuit pattern is not disposed.

Plating lines PL for forming the circuit pattern of the coil member may be disposed outside the coil member region CA. The plating line PL may be connected to each coil member. The circuit pattern including a plating layer may be formed by transferring current to the coil member through the plating line PL.

The plating line PL may include two plating lines PL of a cathode and an anode. The two plating lines PL may be connected to one coil member region CA. That is, in each coil member region CA, two plating lines that transmit current to one surface of the base member may be connected, and two plating lines that transmit current to the other surface of the base member may be connected.

Alternatively, in each coil member region CA, one plating line that transmits current to one surface of the base member 110 may be connected, and one plating line that transmits current to the other surface of the base member 110 may be connected. In other words, at least two plating wires may be connected to one surface or the other surface of the base member 110 in the coil member region.

Figure 4:
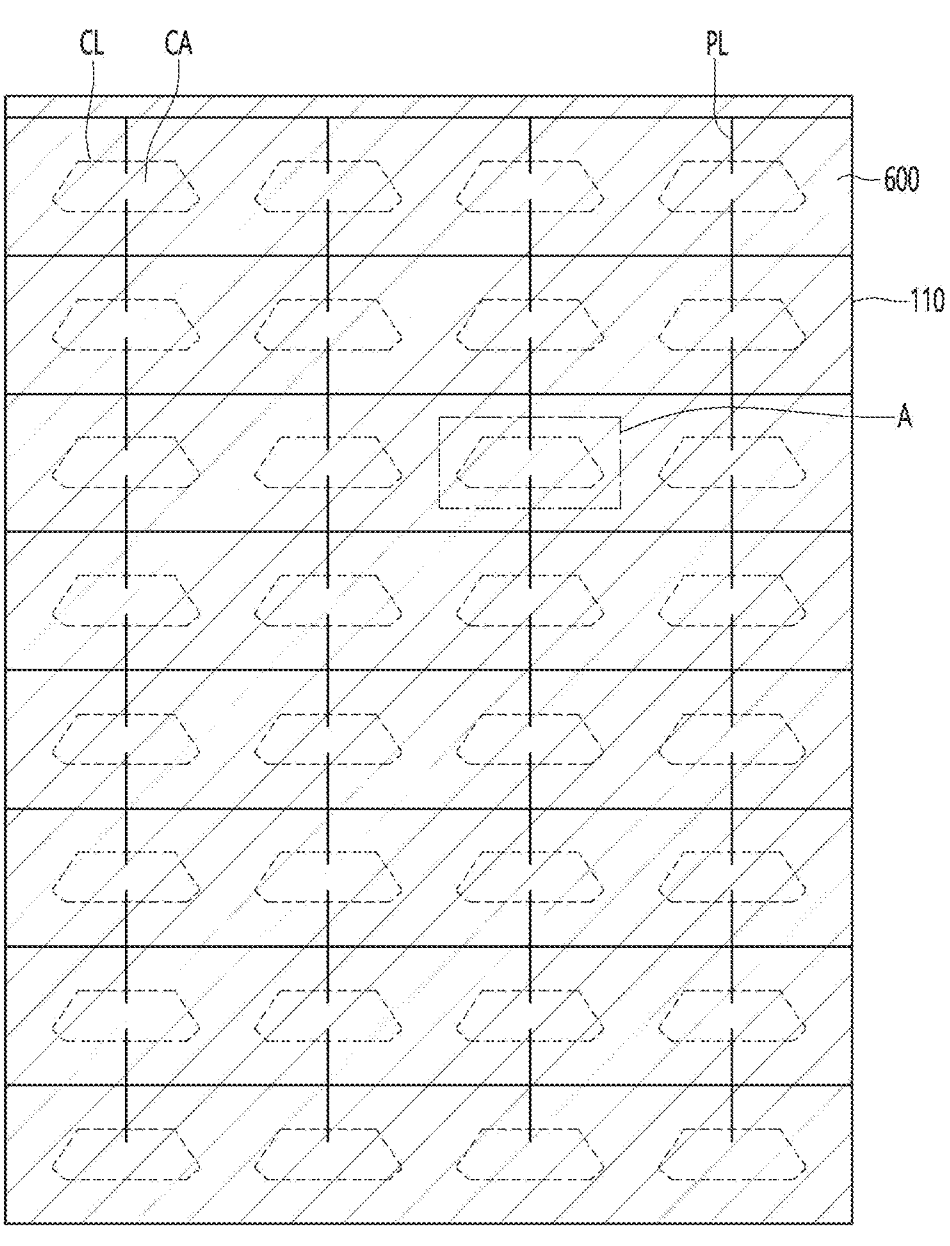
Figure 5:
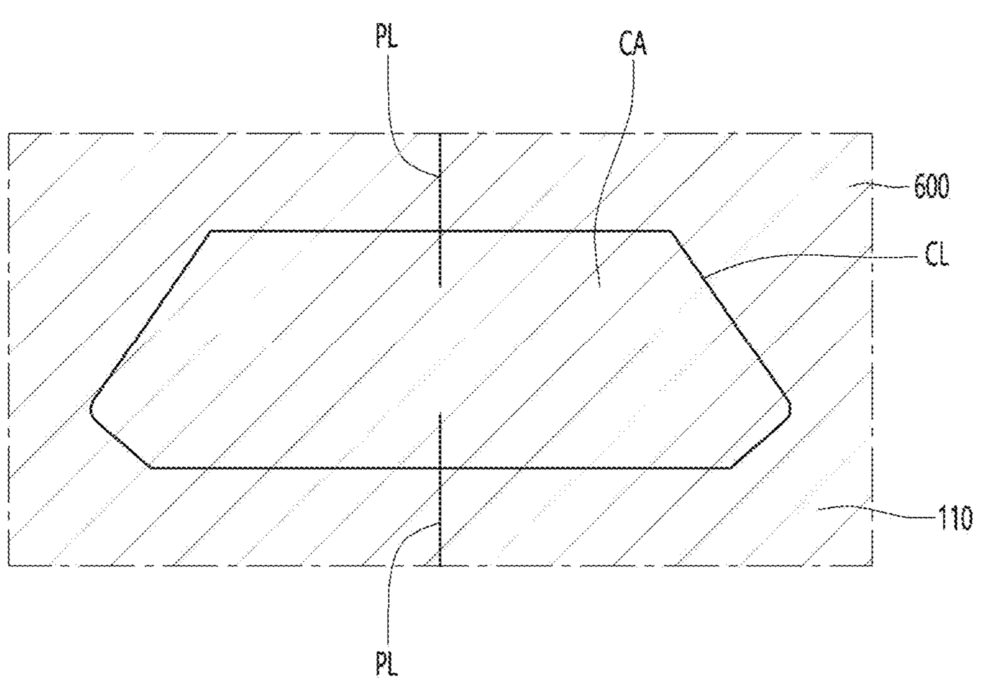

Subsequently, referring to FIGS. 4 and 5, a masking layer 600 may be disposed on the entire surface of the base member 110. That is, the masking layer 600 may be disposed in both the coil member region CA and the outer region of the coil member region CA on the base member 110.

Figure 6:
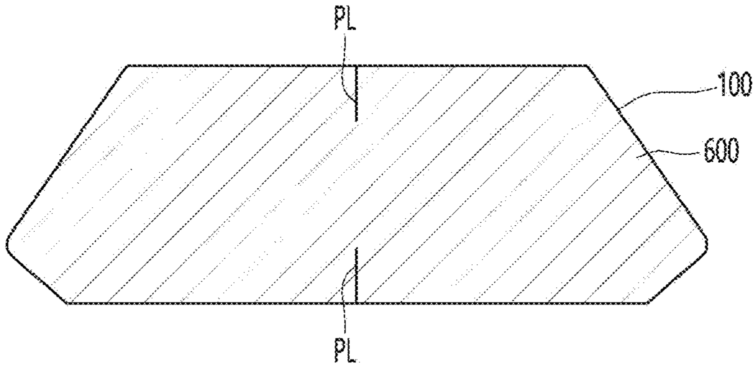

Subsequently, referring to FIG. 6, the base member 110 may be cut. In detail, the base member 110 may be cut along the cutting line CL of the plurality of coil member regions CA disposed on the base member 110.

Accordingly, the coil member 1000 may be cut in a state in which the circuit pattern, the protective layer, and the masking layer are disposed on the base member 110.

Accordingly, when the base member 110 is cut along the cutting line CL with a laser, particles that can be formed by the high-temperature laser may be inhibited from being directly deposited on the protective layer.

That is, since the cutting process proceeds after disposing the masking layer on the protective layer, particles generated during the cutting process may be deposited on the masking layer. Accordingly, it is possible to impurities from being directly deposited on the protective layer during the cutting process or the color of the protective layer from being changed due to high temperatures.

Figure 7:
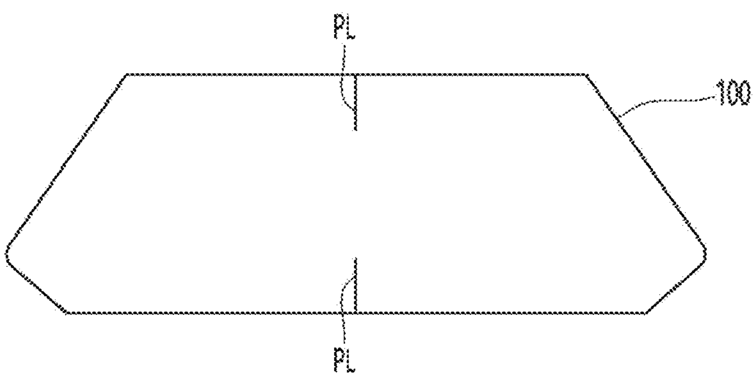

Subsequently, referring to FIG. 7, after the cutting process is completed, the coil member 1000 may be finally formed by removing the masking layer 600 on the protective layer.

Hereinafter, with reference to FIGS. 8 to 12, the coil member manufactured through the above process will be described.

Figure 8:
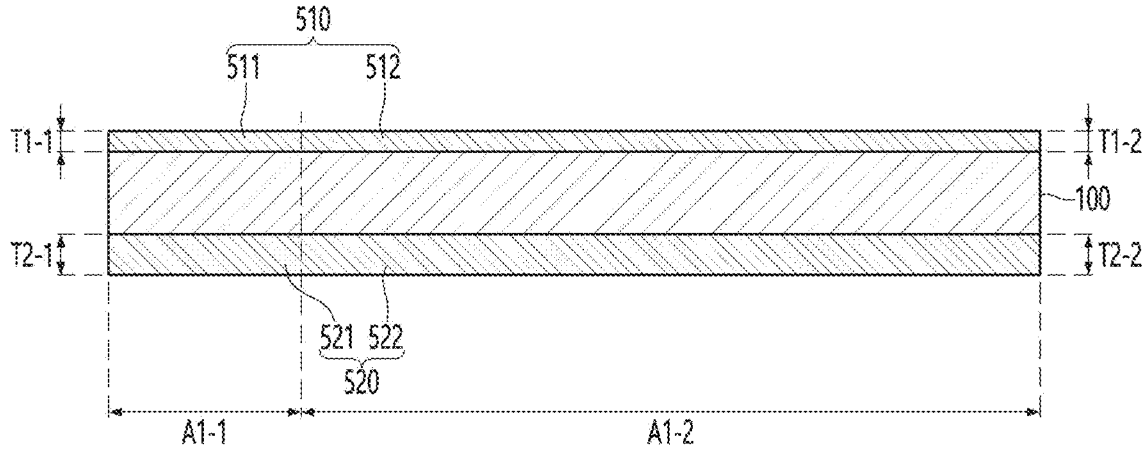
FIG. 8 is a cross-sectional view taken along line A-A' of FIG. 1.
Figure 9:
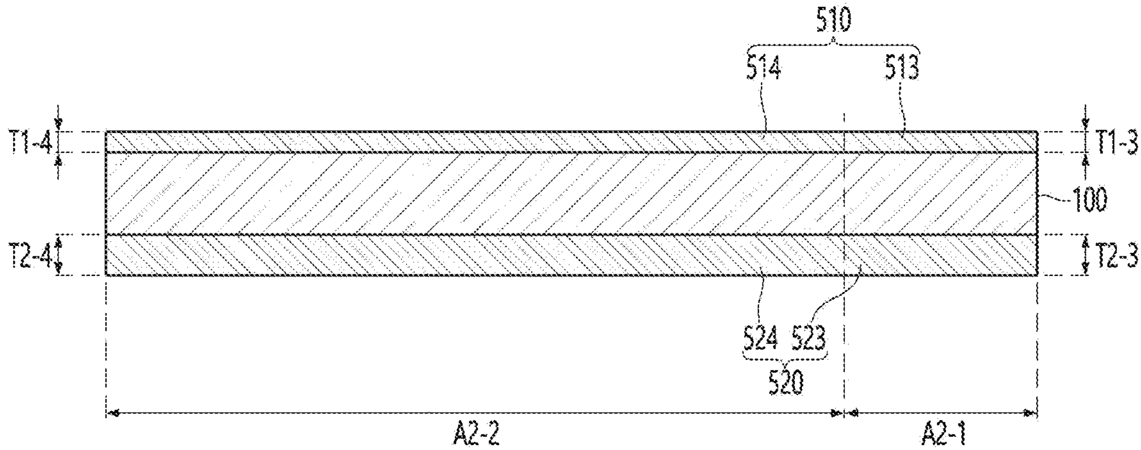
FIG. 9 is a cross-sectional view taken along line B-B' of FIG. 1.

FIG. 8 is a cross-sectional view taken along line A-A' of FIG. 1. FIG. 9 is a cross-sectional view taken along line B-B' of FIG. 1.

Referring to FIG. 8, a protective layer may be disposed on each of the 1-1 region A1-1 and the 1-2 region A1-2. In detail, a 1-1 protective layer 511 may be disposed on the first surface 1S of the 1-1 region A1-1, and a 1-2 protective 512 layer may be disposed on the first surface 1S of the 1-2 region A1-2.

The 1-1 protective layer 511 may have a 1-1 thickness T1-1, and the 1-2 protective layer 512 may have a 1-2 thickness T1-2.

In addition, a 2-1 protective layer 521 may be disposed on the second surface 2S of the 1-1 region A1-1, and a 2-2 protective 522 layer may be disposed on the second surface 2S of the 1-2 region A1-2.

The 2-1 protective layer 521 may have a 2-1 thickness T2-1, and the 2-2 protective layer 522 may have a 2-2 thickness T2-2.

A thickness deviation of the 1-1 protective layer 511 may be 0.1 μm or less. In detail, the thickness deviation of the 1-1 protective layer 511 may be less than 1/200 of the thickness of the first protective layer 510. That is, the thickness deviation of the 1-1 protective layer 511 may be greater than 0 and less than 1/200 of the thickness of the first protective layer 510.

When the thickness deviation of the 1-1 protective layer 511 exceeds 1/200 of the thickness of the first protective layer 510, an appearance defect of the coil member may occur due to the difference in thickness deviation between the 1-1 protective layer 511 and the 1-2 protective layer 512.

In addition, a thickness deviation of the 1-2 protective layer 512 may be 0.1 μm or less. In detail, the thickness deviation of the 1-2 protective layer 512 may be the same as or similar to the thickness deviation of the 1-1 protective layer 511. For example, the thickness deviation of the 1-2 protective layer 512 may be less than or equal to the thickness deviation of the 1-1 protective layer 511.

A thickness deviation of the 2-1 protective layer 521 may be 0.1 μm or less. In detail, the thickness deviation of the 2-1 protective layer 521 may be less than 1/300 of the thickness of the second protective layer 520. That is, the thickness deviation of the 2-1 protective layer 521 may be greater than 0 and less than 1/300 of the thickness of the second protective layer 520.

When the thickness deviation of the 2-1 protective layer 521 exceeds 1/300 of the thickness of the second protective layer 520, an appearance defect of the coil member may occur due to the difference in thickness deviation between the 2-1 protective layer 521 and the 2-2 protective layer 522.

In addition, a thickness deviation of the 2-2 protective layer 522 may be 0.1 μm or less. In detail, the thickness deviation of the 2-2 protective layer 522 may be the same as or similar to the thickness deviation of the 2-1 protective layer 521. For example, the thickness deviation of the 2-2 protective layer 522 may be less than or equal to the thickness deviation of the 2-1 protective layer 521.

That is, the coil member according to the embodiment may reduce a thickness deviation between an adjacent region and a distant region at a first edge, which is an outer edge. That is, the coil member may have improved thickness uniformity in region adjacent to and in region far from the first edge, which are outer edges. In addition, the coil member may have the same or similar thickness uniformity in region adjacent to and in region far from the first edge, which are outer edges.

Accordingly, in the coil member according to the embodiment, a thickness deviation of adjacent regions at the first edge defined as the cut region may be reduced, and a thickness uniformity difference from other regions may be reduced. Accordingly, the coil member according to the embodiment may inhibit defects in appearance due to thickness deviation between regions, and may inhibit bending due to stress difference of the coil member due to thickness deviation. Therefore, the reliability of the coil member may be improved.

Referring to FIG. 9, the protective layer may be disposed on each of the 2-1 region A2-1 and the 2-2 region A2-2. In detail, a 1-3 protective layer 513 may be disposed on the first surface 1S of the 2-1 region A2-1, and a 1-4 protective layer 514 may be disposed on the first surface 1S of the 2-2 region A2-2.

The 1-3 protective layer 513 may have a 1-3 thickness T1-3, and the 1-4 protective layer 514 may have a 1-4 thickness T1-4.

In addition, a 2-3 protective layer 523 may be disposed on the second surface 2S of the 2-1 region A2-1, and a 2-4 protective layer 524 may be disposed on the second surface 2S of the 2-2 region A2-2.

The 2-3 protective layer 523 may have a 2-3 thickness T2-3, and the 2-4 protective layer 524 may have a 2-4 thickness T2-4.

A thickness deviation of the 1-3 protective layers 513 may be 0.1 μm or less. In detail, the thickness deviation of the 1-3 protective layers may be less than 1/200 of the thickness of the first protective layer 510. That is, the thickness deviation of the 1-3 protective layers 513 may be greater than 0 and less than 1/200 of the thickness of the first protective layer 510.

When the thickness deviation of the 1-3 protective layer 513 exceeds 1/200 of the thickness of the first protective layer 510, an appearance defect of the coil member may occur due to the difference in thickness deviation between the 1-3 protective layer 513 and the 1-4 protective layer 514.

In addition, a thickness deviation of the 1-4 protective layer 514 may be 0.1 μm or less. In detail, the thickness deviation of the 1-4 protective layer 514 may be the same as or similar to the thickness deviation of the 1-3 protective layer 513. For example, the thickness deviation of the 1-4 protective layer 514 may be less than or equal to the thickness deviation of the 1-3 protective layer 513.

A thickness deviation of the 2-3 protective layer 523 may be 0.1 μm or less. In detail, the thickness deviation of the 2-3 protective layer 523 may be less than 1/300 of the thickness of the second protective layer 520. That is, the thickness deviation of the 2-3 protective layer 523 may be greater than 0 and less than 1/300 of the thickness of the second protective layer 520.

When the thickness deviation of the 2-3 protective layer 523 exceeds 1/300 of the thickness of the second protective layer 520, an appearance defect of the coil member may occur due to the difference in thickness deviation between the 2-3 protective layer 523 and the 2-4 protective layer 524.

In addition, a thickness deviation of the 2-4 protective layer 524 may be 0.1 μm or less. In detail, the thickness deviation of the 2-4 protective layer 524 may be the same as or similar to the thickness deviation of the 2-3 protective layer 523. For example, the thickness deviation of the 2-4 protective layer 524 may be less than or equal to the thickness deviation of the 2-3 protective layer 523.

That is, the coil member according to the embodiment may reduce a thickness deviation between an adjacent region and a distant region at a second edge, which is an inner edge. That is, the coil member may have improved thickness uniformity in region adjacent to and in region far from the second edge, which are inner edges. In addition, the coil member may have the same or similar thickness uniformity in region adjacent to and in region far from the second edge, which are inner edges.

Accordingly, in the coil member according to the embodiment, a thickness deviation of adjacent regions at the second edge defined as the cut region may be reduced, and a thickness uniformity difference from other regions may be reduced. Accordingly, the coil member according to the embodiment may inhibit defects in appearance due to thickness deviation between regions, and may inhibit bending due to stress difference of the coil member due to thickness deviation. Therefore, the reliability of the coil member may be improved.

Meanwhile, in the coil member according to the embodiment, the protective layer may be disposed on an outer surface of an outer edge and an inner surface of an inner edge of the coil member.

Figure 10:
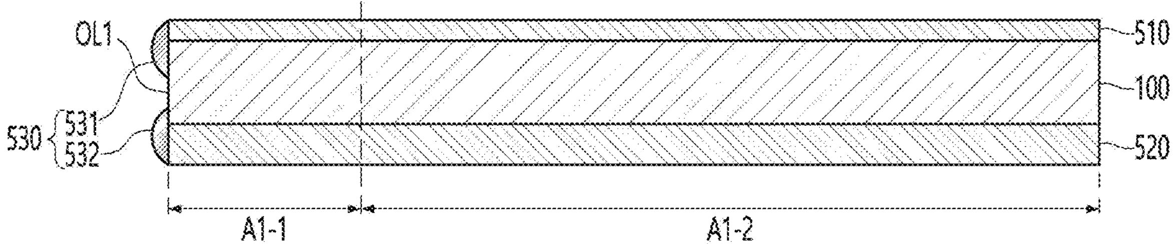
FIGS. 10 and 11 are cross-sectional views taken along line C-C' of FIG. 1.

Referring to FIG. 10, a third protective layer 530 may be disposed on an outer surface of the first edge OL1

The third protective layer 530 may include a 3-1 protective layer 531 and a 3-2 protective layer 532. The 3-1 protective layer 531 may be integrally formed with the first protective layer 510, and the 3-2 protective layer 532 may be integrally formed with the second protective layer 520.

The 3-1 protective layer 531 and the 3-2 protective layer 532 may be formed during a cutting process of the coil member 1000. In detail, the 3-1 protection layer 531 and the 3-2 protection layer 532 may be deposited on the outer surface of the first edge OL1 as the first and second protection layers 510 and 520 of the region adjacent to the cutting line are partially melted during the cutting process of the coil member 1000.

Meanwhile, since particles generated during the cutting process of the coil member are deposited in the third protective layer 530 disposed on the outer surface of the first edge OL1, the thickness deviation of the third protective layer 530 may be greater than that of the first protective layer 510 and the second protective layer 520. That is, the thickness deviation of the third protective layer 530 may be greater than the thickness deviation of the 1-1 protective layer to the 1-4 protective layer and the thickness deviation of the 2-1 protective layer to the 2-4 protective layer.

In detail, particles with a diameter of 0.03 μm to 4 μm generated during the cutting process of the coil member 1000 are disposed at random positions on the surface of the third protective layer 530. Accordingly, a thickness deviation of the third protective layer 530 may occur.

Figure 11:
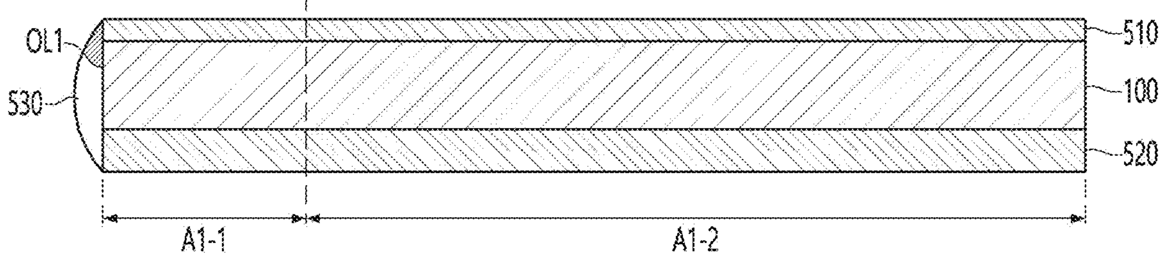

Meanwhile, referring to FIG. 11, the 3-1 protective layer 531 and the 3-2 protective layer 532 may be integrally formed. That is, the third protective layer 530 disposed on the outer surface of the first edge OL1 may be integrally formed with the first protective layer 510 and the second protective layer 520.

In the drawings, the third protective layer 530 formed on the outer surface of the first edge has been mainly described. However, the coil member 1000 according to the embodiment may further include a fourth protective layer formed on an inner surface of the second edge. The fourth protective layer may be integrally formed with at least one protective layer of the first protective layer 510 and the second protective layer 520.

Since the coil member according to the embodiment further includes a third protective layer, adhesion of the protective layer may be improved. That is, since the first and second protective layers disposed on the first and second surfaces of the substrate increase the contact area by the third protective layer, adhesion between the first and second protective layers may be improved.

In addition, since the third protective layer does not directly contact the printed circuit board in contact with the coil member, even if the thickness of the third protective layer is not uniform, bonding defects may not occur when the coil member is applied to the camera module.

Accordingly, the coil member according to the embodiment may have improved reliability.

Hereinafter, a layer structure of a circuit pattern of a coil member according to the embodiment will be described with reference to FIG. 12.

Figure 12:
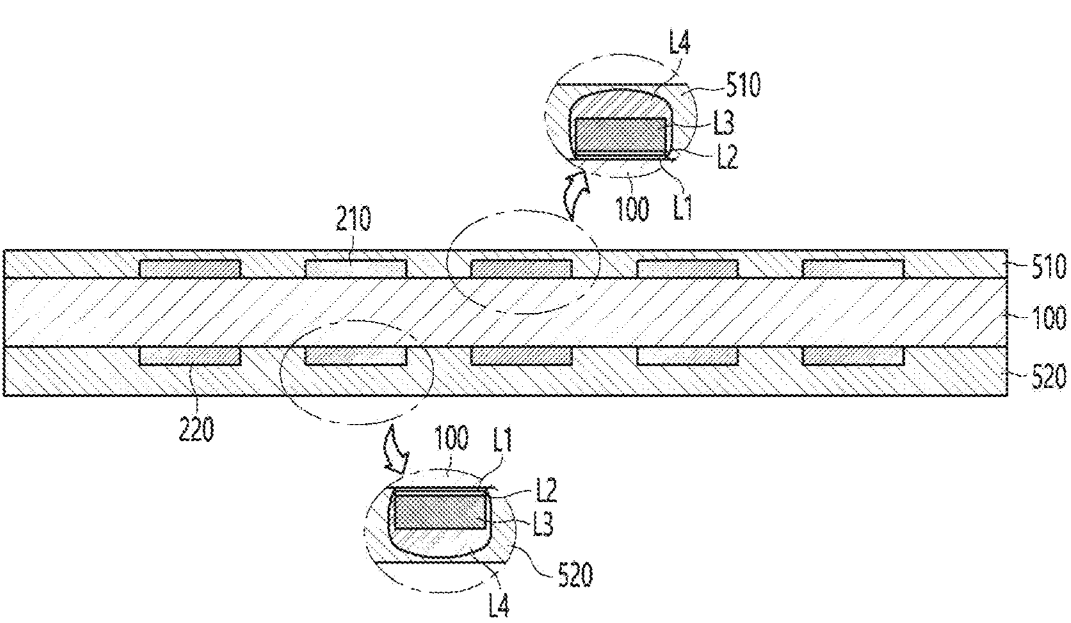
FIG. 12 is a cross-sectional view taken along line D-D' of FIG. 1.

Referring to FIG. 12, the first wiring pattern 210 may include a plurality of layers. In detail, the first wiring pattern 210 may include a plurality of conductive layers. For example, the first wiring pattern 210 may include a first layer L1, a second layer L2, a third layer L3, and a fourth layer L4 sequentially stacked and disposed on the substrate 100. In FIG. 12, the first wiring pattern 210 has been mainly described, but the embodiment is not limited thereto. The second wiring pattern 220 and the dummy pattern may also include the first layer L1, the second layer L2, the third layer L3, and the fourth layer L4 similar to the layer structure of the first wiring pattern 210.

The first layer L1 may be disposed on the substrate 100. In detail, the first layer L1 may be disposed in direct contact with the substrate 100.

The first layer L1 may be formed in multiple layers. For example, the first layer L1 may include at least one of nickel, chromium, and titanium. That is, the first layer L1 may include at least one of a nickel layer, a chromium layer, and a titanium layer. For example, the first layer L1 may include the nickel layer and the chromium layer on the nickel layer.

The first layer L1 may be formed through an electroless plating or sputtering process. The first layer L1 may be disposed to have a thin thickness of a thin film. In detail, the first layer L1 may be disposed to have a thickness of 20 nm or less.

The first layer L1 may be a layer that improves adhesion between the second layer L2 disposed on the first layer L1 and the substrate 100. For example, the nickel layer may have good adhesion to the substrate 100, and the chromium layer may have good adhesion to the nickel layer and the second layer L2. Accordingly, the adhesion of the second layer L2 disposed on the substrate 100 may be improved.

The second layer L2 may be disposed on the first layer L1. The second layer L2 may include a material the same as or different from that of the first layer L1. Specifically, the second layer L2 may include a metal material having excellent conductivity. For example, the second layer L2 may include a metal layer including at least one of copper (Cu), aluminum (Al), chromium (Cr), nickel (Ni), silver (Ag), or molybdenum (Mo), gold (Au), titanium (Ti), and alloys thereof. Preferably, the second layer L2 may include copper. That is, the second layer L2 may be a copper layer.

The second layer L2 may be formed through the electroless plating. The second layer L2 may be disposed to have a thickness greater than that of the first layer L1. In detail, the second layer L2 may be disposed to have a thickness of 0.1 μm to 1 μm.

The third layer L3 may be disposed on the second layer L2. The third layer L3 may include the same material as the second layer L2. For example, both the second layer L2 and the third layer L3 may include copper. That is, the third layer L3 may be a copper layer. In the wiring patterns 210 and 220, the second layer L2 and the third layer L3 including the same material may be distinguished from each other by a difference in the texture of each layer.

The third layer L3 may be formed through electrolytic plating using the second layer L2 as a seed layer. That is, the second layer L2 may be a seed layer for electrolytic plating of the third layer L3, and the third layer L3 may be a plating layer formed through the electrolytic plating. The third layer L3 may be disposed to have a thickness greater than that of the first layer L1 and the second layer L2. In detail, the third layer L3 may be disposed to have a thickness of 20 μm to 50 μm.

The fourth layer L4 may be disposed on the third layer L3. In detail, the fourth layer L4 may be disposed in contact with side surfaces and an upper surface of the third layer L3. In detail, the fourth layer L4 may be disposed while being spaced apart from the substrate 100 and in contact with the side surfaces and the upper surface of the third layer L3. That is, the fourth layer L4 may be disposed to be spaced apart from the substrate 100.

Accordingly, the protective layer 510 and 520 described above may also be disposed inside the wiring pattern 210 and 220 and the dummy pattern 410 and 420. In detail, the protective layer 510 and 520 may also be disposed between the substrate 100 and the wiring pattern 210 and 220 and between the substrate 100 and the dummy pattern 410 and 420. More specifically, the protective layer 510 and 520 may be disposed between the substrate 100 and the wiring pattern 210 and 220 and between the substrate 100 and the fourth layer L4 of the dummy pattern 410 and 420.

Since the wiring pattern 210 and 220 and the fourth layer L4 of the dummy pattern 410 and 420 are spaced apart from the substrate 100 and disposed only on the side surface and the top surface of the third layer L3, the protective layer 510 and 520 may contact the third layer L3 and the fourth layer L4 at between the substrate 100 and the wiring pattern 210 and 220 and between the substrate 100 and the dummy pattern 410 and 420.

Accordingly, the area of the protective layer 510 and 520 may be increased. In addition, since the protective layer 510 and 520 is disposed in a structure supported by the circuit pattern, that is the fourth layer L4, it is possible to inhibit the protective layer 510 and 520 from removal.

The fourth layer L4 may include the same material as the second layer L2 and the third layer L3. For example, the second layer L2, the third layer L3, and the fourth layer L4 may all include copper. That is, the fourth layer L4 may be a copper layer.

The fourth layer L4 may be a plating layer formed through the electrolytic plating. In detail, after the third layer L3 is formed, the fourth layer L4 may be formed by applying a current again through the plating line. The fourth layer L4 may be formed through one or more plating processes, and a plurality of layers having different textures may be formed on the fourth layer L4 according to the number of plating processes.

The fourth layer L4 may be disposed to have a thickness smaller than that of the third layer L3. In detail, the fourth layer L4 may be disposed to have a thickness of 5 μm to 15 μm.

Meanwhile, the wiring patterns 210 and 220 among the circuit patterns may further include a fifth layer. In detail, the fifth layer may be disposed on the pad portions 212*a* and 212*b* of the wiring pattern. The fifth layer may be disposed on the fourth layer L4. The fifth layer may be disposed on the pad portion to facilitate adhesion when the coil member and a terminal of the printed circuit board are connected.

The fifth layer may include a material the same as or different from those of the second to fourth layers. In detail, the fifth layer L5 may include tin (Sn). That is, the fifth layer may include a tin layer. Alternatively, the fifth layer may include both copper and tin. For example, a tin content may be increased while the fifth layer extends from the fourth layer L4 toward an upper surface of the fifth layer L5.

The fifth layer may have a thickness smaller than those of the second to fourth layers. In detail, the thickness of the fifth layer may be 0.3 μm to 0.8 μm.

Figure 13:
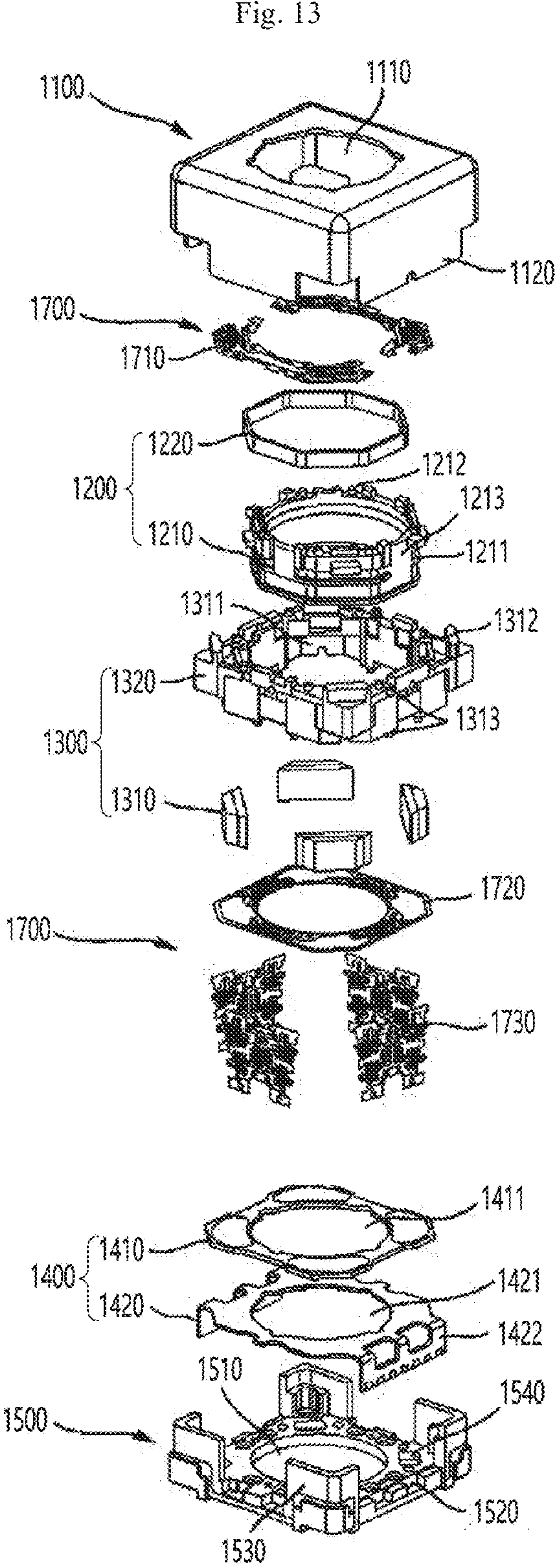
FIG. 13 is a perspective view of a camera module including the coil member according to the embodiment

Hereinafter, a camera module including the coil member according to an embodiment will be described with reference to FIG. 13. FIG. 13 is a view showing a combined perspective view of the camera module according to the embodiment.

Referring to FIG. 13, a camera module 10 according to the embodiment includes a cover can 1100, a first mover 1200, a second mover 1300, a stator 1400, a base 1500, and an elastic unit 1600. In addition, although not shown in FIG. 13, the camera module 10 according to the embodiment may further include a printed circuit board, an IR filter, an image sensor, and the like.

The cover can 1100 accommodates the elastic unit 1600, the first mover 1200, the stator 1400, and the second mover 1300 and is mounted on the base 1500 to form an exterior of a lens driving motor. Specifically, an inner surface of the cover can 1100 is in close contact with some or all of side surfaces of the base 1500 to be mounted on the base 1500, and the cover can 1100 has a function of protecting internal components from external impacts and inhibiting penetration of external contaminants.

In addition, the cover can 1100 should also perform a function of protecting the lens driving motor or the components of the camera module from external radio wave interference generated by a mobile phone or the like. Therefore, the cover can 1100 is preferably formed of a metal material.

The cover can 1100 may be implemented as a yoke unit itself, which will be described below, or may be fixed by molding the yoke unit on the inside thereof. In addition, an opening 1110 through which a lens unit (not shown) is exposed may be formed on an upper surface of the cover can 1100, and an inner yoke (not shown) bent inside the cover can 1100 may be formed at a lower end portion of the upper surface of the cover can 1100. This inner yoke may be positioned in a concave portion 1213 formed in the bobbin 1210. In this case, the inner yoke may be disposed at a corner around the opening on an upper surface of the yoke portion or may be disposed on a side surface of the yoke portion, and the concave portion of the bobbin may be formed at a corresponding position.

In addition, the cover can 1100 may have a fastening piece 1120 formed so as to extend at least one on each surface of the lower end portion thereof, and it is possible to implement a more robust sealing function and fastening function of the lens driving motor by forming a fastening groove 1520 into which the fastening piece 1120 is inserted in the base 1500. In addition, the fastening piece and the fastening groove may not be separately present, and only one of the two may be formed.

Meanwhile, the first mover 1200 is disposed on a side surface of the lens unit in order to move the lens unit (not shown). The first mover 1200 includes the bobbin 1210 for fixing the lens unit and a first coil member 1220 provided on an outer circumferential surface of the bobbin 1210.

The lens unit (not shown) may be a lens barrel provided with one or more lenses (not shown), but the embodiment is not limited thereto, and any holder structure capable of supporting the lens may be included.

An inner circumferential surface of the bobbin 1210 is coupled to an outer circumferential surface of the lens unit to fix the lens unit. In addition, the bobbin 1210 may have a guide part 1211, which guides the winding or mounting of the first coil member 1220, on an outer circumferential surface thereof. The guide part 1211 may be integrally formed with an outer surface of the bobbin 1210, and may be formed continuously along the outer surface of the bobbin 1210 or may be formed to be spaced apart at predetermined intervals.

In addition, a spring fastening protrusion 1212, to which an upper spring 1710 or a lower spring 1720 provided on the upper side of the base 1500 to support the bobbin 1210 is fastened, may be formed on the upper and lower surfaces of the bobbin 1210.

In addition, the bobbin 1210 may further include a concave portion 1213 formed on the outer circumferential surface thereof so that the inner yoke of the cover can 1100 may be positioned between the bobbin 1210 and the first coil member 1220 wound around the bobbin 1210.

In addition, the first coil member 1220 may be guided by the guide part 1211 and wound on the outer surface of the bobbin 1210, but four individual coils may be formed on the outer surface of the bobbin 1210 at 90° intervals. The first coil member 1220 may receive power applied from a printed circuit board (not shown) to be described later to form an electromagnetic field.

Meanwhile, the second mover 1300 may be positioned to face the first mover 1200 on a side surface of the first mover 1200 and may include a magnet part 1310 disposed so as to face the first coil member 1220 and a housing 1320 to which the magnet part 1310 is fixed.

Specifically, the magnet part 1310 may be mounted to the housing 1320 by an adhesive or the like so as to be disposed at a position corresponding to an outer surface of the first coil member 1220 and may be mounted on four corners inside the housing 1320 at equivalent intervals to promote efficient use of the internal volume.

The housing 1320 may be formed in a shape corresponding to an inner surface of the cover can 1100 forming the exterior of the lens driving motor. In addition, the housing 1320 may be formed of an insulating material and may be made as an injection molding product in consideration of productivity. The housing 1320 may be a moving part for OIS driving and may be disposed to be spaced apart from the cover can 1100 by a certain distance.

In the embodiment, the housing 1320 may be formed in a hexahedral shape to be spaced apart by a predetermined distance corresponding to a shape of the cover can 1100, and upper and lower sides of the housing 1320 may be opened to support the first mover 1200. In addition, the housing 1320 may include a magnet part fastening hole 1311 or a magnet part fastening groove formed in a shape corresponding to the magnet part 1310 on a side surface thereof.

In addition, at least two stoppers 1312 that are formed to protrude at a predetermined distance from an upper surface of the housing 1320 to be in contact with the upper surface of the cover can 1100 to enable to absorb an external impact may be formed. The stopper 1312 may be formed integrally with the housing 1320.

In addition, a spring fastening protrusion 1313 to which the upper spring 1710 or the lower spring 1720 provided on the upper side of the base 1500 to be described later so as to support the housing 1320 is fastened may be formed on the upper and lower surfaces of the housing 1320.

Meanwhile, the stator 1400 is positioned to face a lower side of the second mover 1300 in order to move the second mover 1300 and has through-holes 1411 and 1421 corresponding to the lens unit that are formed in a center thereof.

Specifically, the stator 1400 may include a second coil member 1410 positioned so as to face a lower side of the magnet part 1310 and a substrate on which the second coil member 1410 is disposed on the upper side to apply power, and an OIS chip is mounted, and the substrate may be a printed circuit board 1420. That is, the second coil member 1410 may be the coil member described above with reference to FIGS. 1 to 12.

The second coil member 1410 may be mounted on the printed circuit board 1420 provided on the upper side of the base 1500 or formed on a flexible printed circuit board or a substrate, and the through-hole 1411 is formed in the center in order to pass a light signal of the lens unit (not shown). Meanwhile, when considering the miniaturization of the lens driving motor, specifically, lowering the height in a z-axis direction, which is an optical axis direction, the second coil member 1410 may be formed as a fine pattern (FP) coil that is a patterned coil and disposed on the flexible printed circuit board.

The flexible printed circuit board 1420 may be provided on an upper surface of the base 1500 to apply power to the second coil member 1410, and the through-hole 1421 corresponding to the through-hole 1411 of the second coil member 1410 is formed on the flexible printed circuit board 1420. In addition, the printed circuit board 1420 may include a terminal portion 1422 having one end or both ends facing each other bent to protrude to the lower side of the base 1500 and may be supplied with external power through the terminal portion 1422.

In addition, the embodiment may further include a hall sensor unit (not shown) mounted on a lower or upper surface of the printed circuit board 1420 so as to correspond to a position of the magnet part 1310.

The hall sensor unit senses an intensity and phase of a voltage applied to detect the movement of the magnet part 310 and a current flowing through the coil and interacts with the printed circuit board 1420 to be provided in order to precisely control the actuator.

The hall sensor unit may be provided on a straight line with respect to the magnet part 1310 and the optical axis direction, and since the hall sensor unit has to detect displacements in the x-axis and y-axis, the hall sensor unit may include two hall sensors respectively provided at adjacent two corners among corners of the printed circuit board 1420. A hall sensor receiving groove 1540 capable of accommodating the hall sensor may be formed in the base 1500. In addition, the hall sensor may be provided with one or more.

Although the hall sensor unit is provided closer to the second coil member 1410 than the magnet part 1310, considering that the strength of the magnetic field formed in the magnet part is several hundred times greater than the strength of the electromagnetic field formed in the coil, the influence of the second coil member 1410 in detecting the movement of the magnet part 1310 is not considered.

The lens unit is moved in all directions by the independent or organic interaction of the first mover 1200, the second mover 1300, and the stator 1400, so that the image focus of a subject is focused through the interaction of the first mover 1200 and the second mover 1300, and a camera shake and the like may be corrected by the interaction of the second mover 1300 and the stator 1400.

Meanwhile, the base 1500 supports the stator 1400 and the second mover 1300, and a hollow hole 1510 corresponding to the through-holes 1411 and 1421 is formed in a center thereof.

The base 1500 may function as a sensor holder to protect an image sensor (not shown) and may be provided to position an IR filter (not shown) at the same time. In this case, the IR filter may be mounted in the hollow hole 1510 formed in the center of the base 1500, and an infrared ray (IR) filter may be provided. In addition, the IR filter may be formed of, for example, a film material or a glass material, and an infrared blocking coating material may be disposed on a plate-shaped optical filter such as a cover glass for protecting an imaging surface, a cover glass, or the like. In addition, a separate sensor holder may be positioned under the base in addition to the base.

In addition, the base 1500 may be formed with one or more fixing protrusions 1530 protruding from an upper corner to face or couple to the inner surface of the cover can 1100, and such a fixing protrusion 1530 may easily guide fastening of the cover can 1100 and may achieve firm fixation after fastening. In addition, two or more fixing protrusions may be formed.

In addition, the base 1500 may have the fastening groove 1520 into which the fastening piece 1120 of the cover can 1100 is inserted. The fastening groove 520 may be formed locally on an outer surface of the base 1500 in a shape corresponding to a length of the fastening piece 1120 or may be formed entirely on the outer surface of the base 1500 so that a predetermined part of the lower end portion of the cover can 1100 including the fastening piece 1120 is inserted.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present disclosure.

In addition, embodiments are mostly described above, but the embodiments are merely examples and do not limit the present disclosure, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present disclosure defined in the following claims.

The invention claimed is:

1. A coil member comprising:

a substrate including a first surface and a second surface opposite to the first surface and including a hole;

a circuit pattern disposed on at least one of the first surface and the second surface and including a wiring pattern, a plating pattern, and a dummy pattern; and a protective layer disposed on the substrate while surrounding the circuit pattern, wherein the protective layer includes a first protective layer disposed on the first surface; and a second protective layer disposed on the second surface, wherein the substrate includes a first edge disposed outside the substrate and a second edge surrounding the hole, wherein the substrate includes a 1-1 region and a 1-2 region adjacent to the first edge, wherein the 1-1 region is disposed between the first edge and the 1-2 region, wherein a 1-1 protective layer is disposed on the first surface of the 1-1 region, wherein a 1-2 protective layer is disposed on the first surface of the 1-2 region, wherein a thickness deviation of the 1-1 protective layer is 0.1 μm or less.

2. The coil member of claim 1, wherein the thickness deviation of the 1-1 protective layer is greater than 0 and less than 1/200 of the thickness of a first protective layer.

3. The coil member of claim 2, wherein a thickness deviation of the 1-2 protective layer is less than or equal to the thickness deviation of the 1-1 protective layer.

4. The coil member of claim 1, wherein a 2-1 protective layer is disposed on the second surface of the 1-1 region, wherein a 2-2 protective layer is disposed on the second surface of the 1-2 region, wherein a thickness deviation of the 2-1 protective layer is greater than 0 and less than 1/300 of a thickness of the second protective layer.

5. The coil member of claim 1, wherein the substrate includes a 2-1 region and a 2-2 region adjacent to the second edge, wherein the 2-1 region is disposed between the first edge and the 2-2 region, wherein a 1-3 protective layer is disposed on the first surface of the 2-1 region, wherein a 1-4 protective layer is disposed on the first surface of the 2-2 region, wherein a thickness deviation of the 1-3 protective layer is 0.1 μm or less.

6. The coil member of claim 5, wherein the thickness deviation of the 1-3 protective layers is greater than 0 and less than 1/200 of the thickness of the first protective layer.

7. The coil member of claim 5, wherein a 2-3 protective layer is disposed on the second surface of the 2-1 region, wherein a 2-4 protective layer is disposed on the second surface of the 2-2 region, wherein a thickness deviation of the 2-3 protective layer is greater than 0 and less than 1/300 of a thickness of the second protective layer.

8. The coil member of claim 1, comprising a third protective layer disposed on the outer surface of the first edge and the inner surface of the second edge, wherein a thickness deviation of the third protective layer is greater than each of the thickness deviation of the 1-1 protective layer and a thickness deviation of the 1-2 protective layer.

9. The coil member of claim 8, wherein the third protective layer is integrally formed with at least one protective layer of the first protective layer and the second protective layer.

10. A camera module comprising:

A first mover disposed on a side surface of a lens unit to move the lens unit;

a second mover positioned to face the first mover on a side surface of the first mover;

a stator positioned to face a lower side of the second mover to move the second mover and having a through-hole corresponding to the lens unit formed in a center thereof; and a base supporting the stator and the second mover and having a hollow hole corresponding to a through-hole of the second mover formed in a center thereof, wherein the stator includes a circuit board and a coil member disposed on the circuit board, wherein the coil member includes:

a substrate including a first surface and a second surface opposite to the first surface and including a hole;

a circuit pattern disposed on at least one of the first surface and the second surface and including a wiring pattern, a plating pattern, and a dummy pattern; and a protective layer disposed on the substrate while surrounding the circuit pattern, wherein the protective layer includes a first protective layer disposed on the first surface; and a second protective layer disposed on the second surface, wherein the substrate includes a first edge disposed outside the substrate and a second edge surrounding the hole, wherein the substrate includes a 1-1 region and a 1-2 region adjacent to the first edge, wherein the 1-1 region is disposed between the first edge and the 1-2 region, wherein a 1-1 protective layer is disposed on the first surface of the 1-1 region, wherein a 1-2 protective layer is disposed on the first surface of the 1-2 region, wherein a thickness deviation of the 1-1 protective layer is 0.1 μm or less.

11. The coil member of claim 2, wherein a thickness deviation of the 1-2 protective layer is 0.1 μm or less.

12. The coil member of claim 1, wherein a thickness deviation of the 2-1 protective layer is 0.1 μm or less.

13. The coil member of claim 1, wherein a thickness deviation of the 2-2 protective layer is 0.1 μm or less.

14. The coil member of claim 4, wherein a thickness deviation of the 2-2 protective layer is less than or equal to the thickness deviation of the 2-1 protective layer.

15. The coil member of claim 5, wherein a thickness deviation of the 1-3 protective layer is 0.1 μm or less.

16. The coil member of claim 5, wherein a thickness deviation of the 1-4 protective layer is 0.1 μm or less.

17. The coil member of claim 5, wherein a thickness deviation of the 1-4 protective layer is less than or equal to a thickness deviation of the 1-2 protective layer.

18. The coil member of claim 7, wherein a thickness deviation of the 2-3 protective layer is 0.1 μm or less.

19. The coil member of claim 7, wherein a thickness deviation of the 2-4 protective layer is 0.1 μm or less.

20. The coil member of claim 7, wherein a thickness deviation of the 2-4 protective layer is less than or equal to the thickness deviation of the 2-3 protective layer.

* * * * *